(12) United States Patent
Park et al.

(10) Patent No.: US 11,309,956 B2
(45) Date of Patent: Apr. 19, 2022

(54) METHOD FOR COMPENSATING BORESIGHT ERROR IN LOW EARTH ORBIT SATELLITE ANTENNA

(71) Applicant: AJOU UNIVERSITY INDUSTRY-ACADEMIC COOPERATION FOUNDATION, Suwon-si (KR)

(72) Inventors: Yong Bae Park, Seoul (KR); Chang Seong Kim, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 41 days.

(21) Appl. No.: 17/349,034

(22) Filed: Jun. 16, 2021

(65) Prior Publication Data

US 2022/0052755 A1    Feb. 17, 2022

(30) Foreign Application Priority Data

Jul. 6, 2020    (KR) .................. 10-2020-0083014

(51) Int. Cl.
*H04B 7/185*    (2006.01)
*G01W 1/02*    (2006.01)

(52) U.S. Cl.
CPC .......... *H04B 7/18519* (2013.01); *G01W 1/02* (2013.01); *H04B 7/18513* (2013.01)

(58) Field of Classification Search
CPC .............. H04B 7/15849; H04B 10/112; H04B 7/18513; H04B 7/195; H04B 7/18521; H04B 7/18508; H04B 7/18517; H04B 7/18519; H04B 7/19; H04B 7/18504; H04B 7/18515; H04B 7/185; H04B 10/118; H04B 7/1851; H04B 7/18578
See application file for complete search history.

(56) References Cited

U.S. PATENT DOCUMENTS 10,476,584 B1 * 11/2019 Minelli ............. H04B 7/18517
2018/0375214 A1 * 12/2018 Runyon ............. H01Q 13/0241

FOREIGN PATENT DOCUMENTS

KR    10-2019-0014914 A    2/2019
KR    10-1992346 B1    6/2019

* cited by examiner

*Primary Examiner* — Asad M Nawaz
*Assistant Examiner* — Najeeb Ansari
(74) *Attorney, Agent, or Firm* — Sughrue Mion, PLLC

(57) ABSTRACT

The method for compensating a boresight error in a low earth orbit (LEO) satellite antenna according to the present disclosure comprising the steps of: converting a communication point of the LEO satellite and the location of the ground station into the geocentric coordinate system, and setting an incidence angle of the electromagnetic wave radiated from the antenna of the LEO satellite; calculating the measured meteorological condition as a meteorological condition at a specific altitude interval; calculating the meteorological conditions respectively as an effective refractive index; dividing the atmosphere into layers at specific altitude intervals, and calculating an arrival coordinate of the electromagnetic wave for which the atmospheric environment is considered; when the error between the location of the ground station and the arrival coordinate of the electromagnetic wave is less than a target error, deciding the compensating angle for the incidence angle of the electromagnetic wave.

5 Claims, 5 Drawing Sheets

METHOD FOR COMPENSATING BORESIGHT ERROR IN LOW EARTH ORBIT SATELLITE ANTENNA

This application claims priority to Korean Patent Applications No. 10-2020-0083014, filed on Jul. 6, 2020, all the benefits accruing therefrom under 35 U.S.C. § 119, the disclosures of which are incorporated herein in its entirety by reference.

TECHNICAL FIELD

The present disclosure relates to a method for compensating a boresight error in a Low Earth Orbit (LEO) satellite antenna, and more particularly, relates to a method for compensating a boresight error in an LEO satellite antenna that, considering nonhomogeneous propagation environment due to the meteorological conditions on a path of an electromagnetic wave reaching a ground station from the antenna of the moving LEO satellite, repeatedly compensates a boresight error by calculating the boresight error based on refraction and attenuation.

BACKGROUND

Electromagnetic wave radiated from a satellite antenna to a ground station is refracted and attenuated while passing through the atmosphere having a nonhomogeneous characteristic. Since an LEO satellite usually rotates earth orbit around 16 times a day, the magnitude of incidence angle varies when an electromagnetic wave radiated from the LEO satellite enters the atmosphere interface surface depending on the point of communication with the ground station. A change in the incidence angle based on a communication point causes a boresight error between the satellite and the ground station resulting in a weakening of the received signal strength, therefore, compensating the boresight error is required.

However, conventionally, only the nonhomogeneous atmospheric effect of the electromagnetic waves radiated from a stationary satellite antenna was considered, the nonhomogeneous atmospheric effect of the electromagnetic waves radiated from a moving LEO satellite antenna was not considered.

Korean Patent Laid-Open Publication No. 10-2017-0129747 (Patent Document 1) discloses "Method and apparatus for time or frequency synchronization in non-geosynchronous satellite communication systems," and the disclosed method for controlling the transmission time and a radio frequency is that a method of controlling a time of transmission and radio frequency of a first signal at a first ground station in communication with a satellite, the method comprising: computing a pre-correction time value based on a local time reference and a received signal or ephemeris of the satellite; applying the pre-correction time value to adjust the time of transmission of the first signal at the first ground station; computing a pre-correction frequency value based on a local frequency reference and the received signal or ephemeris of the satellite; and applying the pre-correction frequency value to adjust the radio frequency of the first signal at the first ground station.

According to the Patent Document 1, by eliminating or reducing differential Doppler frequency shift and differential time delays between different user terminals within a beam coverage of a non-geosynchronous satellite, the transmission time of the return link signals from all user terminals can be adjusted to arrive at a satellite or gateway without large frequency offset differentials, and the carrier frequency of the return link signal can be also adjusted to arrive a satellite or gateway without large frequency offset differentials. However, in the communication between a user terminal on the ground and a satellite, the nonhomogeneous propagation environment (nonhomogeneous atmospheric effect) relating to various meteorological conditions is not considered. Therefore, there is a problem that the boresight error caused by the effect of such a nonhomogeneous atmosphere cannot be met.

The present disclosure was contrived in consideration of the above matters comprehensively, and the object of the present disclosure is to provide a method for compensating a boresight error in an LEO satellite antenna that, considering a nonhomogeneous propagation environment due to the meteorological conditions on a path of an electromagnetic wave reaching a ground station from the antenna of the moving LEO satellite, repeatedly compensates boresight error by calculating the boresight error based on refraction and attenuation, thereby increasing the arrival accuracy of an electromagnetic wave in the real atmospheric environment.

SUMMARY

To achieve the above object, a method for compensating a boresight error in an LEO satellite antenna according to the present disclosure is a method for compensating a boresight error of an electromagnetic wave, considering a nonhomogeneous propagation environment due to the meteorological conditions on a path of the electromagnetic wave reaching a ground station from the antenna of the moving low orbit satellite, comprises the steps of:

a) converting a communication point of the LEO satellite and the location of the ground station into the geocentric coordinate system, and setting an incidence angle of the electromagnetic wave radiated from the LEO satellite antenna;

b) calculating a meteorological condition at a specific altitude interval by applying a specific formula to a measured meteorological condition;

c) calculating the calculated meteorological condition at a specific altitude interval as an effective refractive index at a specific altitude interval;

d) dividing the atmosphere into layers at the specific altitude intervals, and calculating an arrival coordinate of the electromagnetic wave for which the atmospheric environment is considered by using the calculated effective refractive index and a specific technique;

e) calculating an error between the location of the ground station and the arrival coordinate of the electromagnetic wave as a zenith angle and an azimuth angle of the geocentric coordinate system;

f) determining whether the error between the location of the ground station and the arrival coordinate of the electromagnetic wave is less than a target error or not, and when the error is not less than the target error, adding the error to the incidence angle of the electromagnetic wave and returning to step d); and g) in step f), when the error between the location of the ground station and the arrival coordinate of the electromagnetic wave is less than the target error, deciding a compensation angle for the incidence angle of the electromagnetic wave.

Preferably, the meteorological condition measured in step b) may include at least one of air pressure, temperature, humidity, wind speed, wind direction, snow, rain, cloud, aerosol, and yellow sand.

Preferably, in step b), the specific formula may be the Piecewise Cubic Hermite Interpolating Polynomial (PCHIP).

Preferably, in step c), the effective refractive index can be calculated by applying a Millimeter-wave Propagation Model (MPM) to the meteorological data calculated by applying a two-dimensional interpolation method to the meteorological data at a specific altitude interval (h0, h1, . . . , hn).

Preferably, in step d), the atmosphere is divided into layers at specific altitude intervals and set as a dielectric media having an effective refractive index calculated by the MPM.

Preferably, the specific technique in step d) may be a ray tracing method.

Preferably, the target error in step f) may be 0.01%.

According to the present disclosure, by considering a nonhomogeneous propagation environment due to the meteorological conditions on a path of an electromagnetic wave reaching a ground station from the antenna of the moving LEO satellite, the method repeatedly compensates boresight error by calculating the boresight error based on refraction and attenuation, thereby increasing the arrival accuracy of an electromagnetic wave in the atmospheric environment.

DETAILED DESCRIPTION

Hereinafter, embodiments of the present disclosure will be described in detail with reference to the accompanying drawings. The embodiments of the present disclosure are to provide the persons having ordinary skill in the art with a more complete description of the present disclosure, and the following examples may be modified in various other forms, however, the scope of the present disclosure is not limited to the embodiments. Rather, the embodiments are provided to render the present disclosure more faithful and complete and to fully introduce the spirit of the present disclosure to the persons having ordinary skill in the art.

Figure 1:
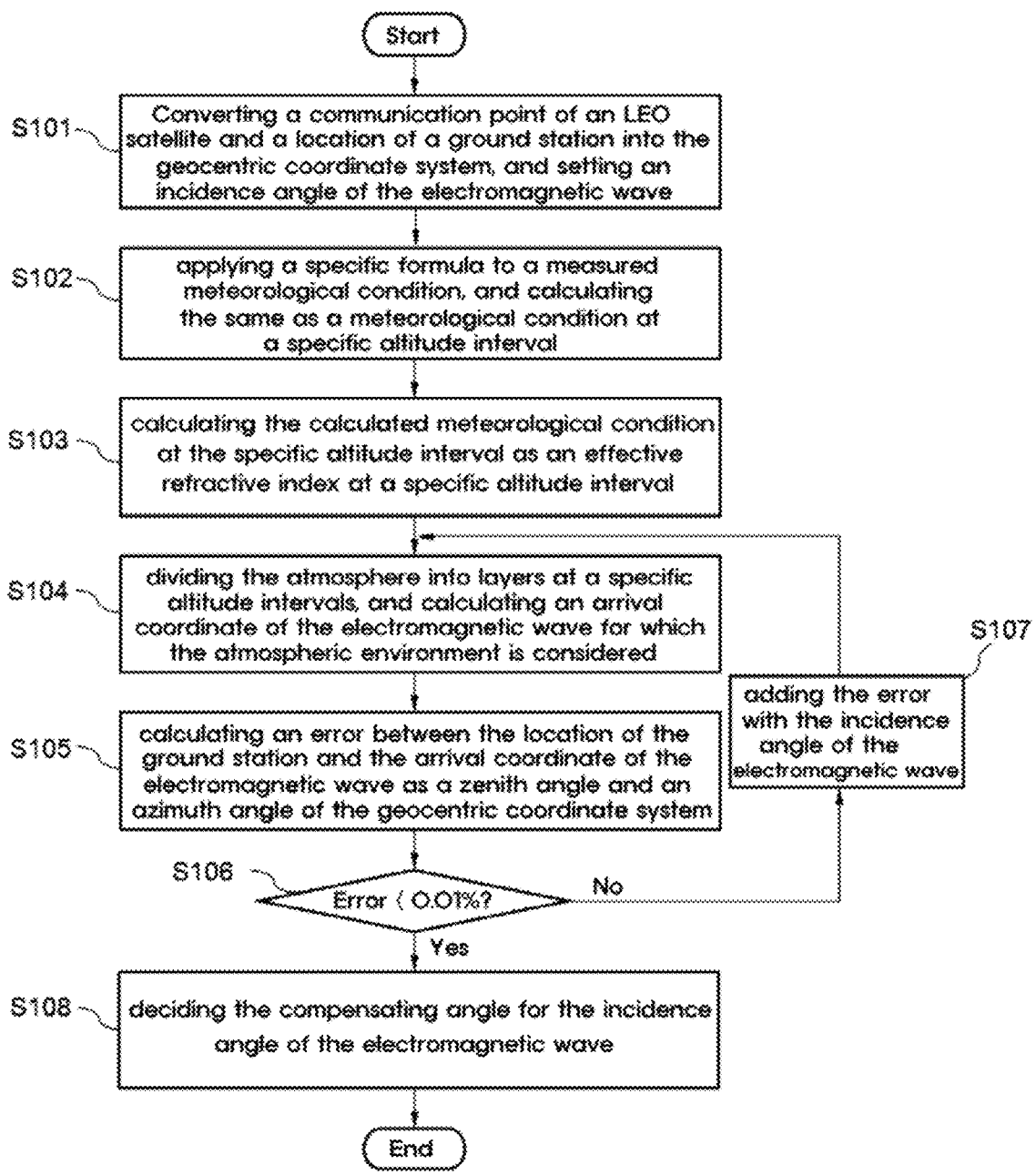
FIG. 1 is a flowchart showing an execution process of a method for compensating a boresight error in an LEO satellite antenna according to the present disclosure.
Figure 2:
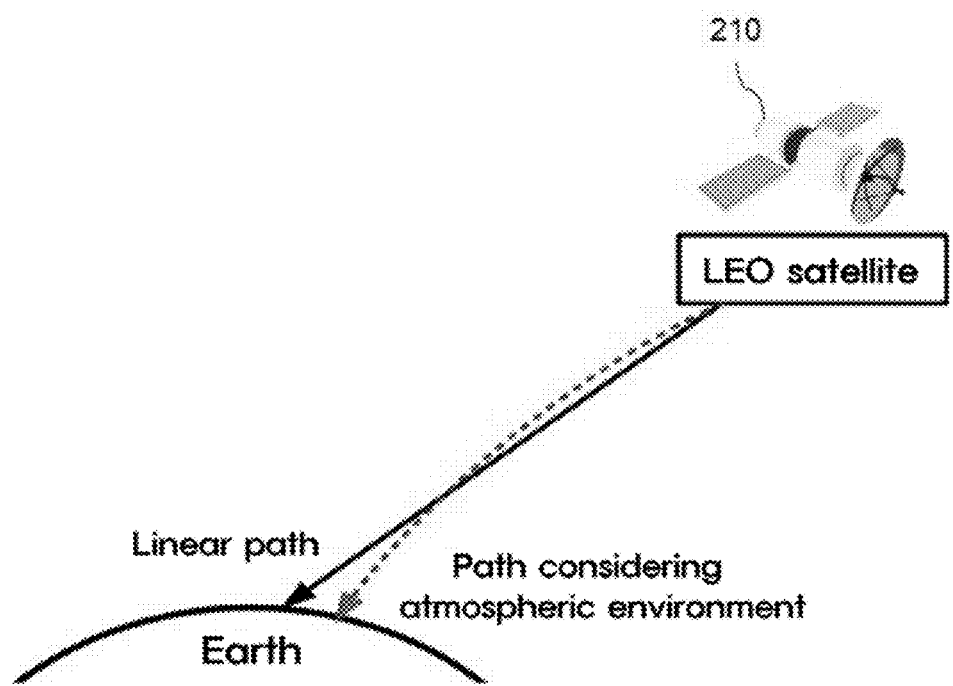
FIG. 2 is a diagram showing an overview of a boresight error of an electromagnetic wave due to a nonhomogeneous atmospheric propagation environment.
Figure 3:
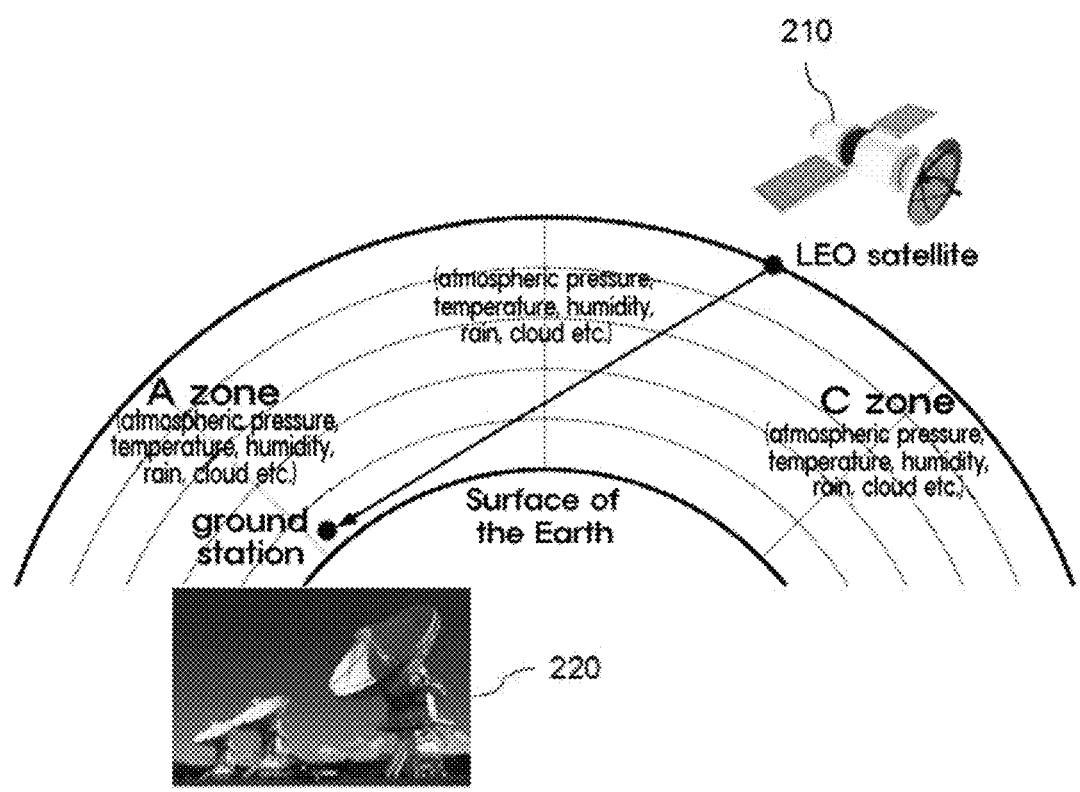
FIG. 3 is a diagram showing a nonhomogeneous atmosphere propagation environment in a path between an LEO satellite and a ground station.
Figure 4:
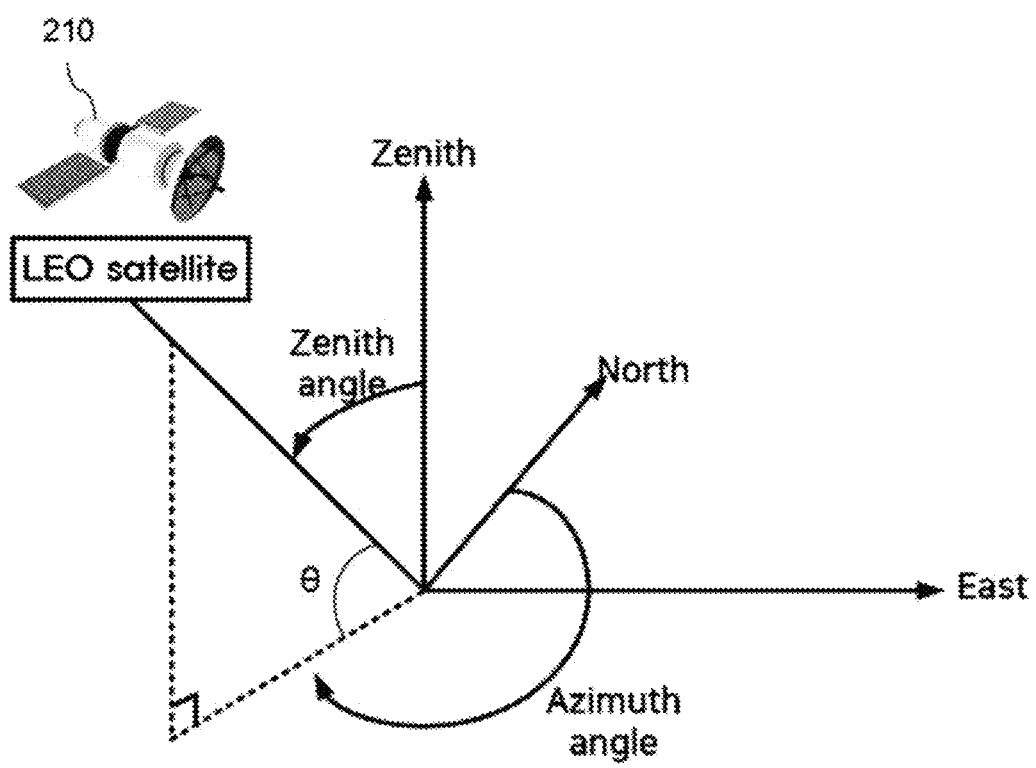
FIG. 4 is a diagram showing a zenith angle and an azimuth angle in a geocentric coordinate system for indicating an incidence angle of an antenna (electromagnetic wave).

FIG. 1 is a flowchart showing an execution process of a method for compensating a boresight error in an LEO satellite antenna according to the present disclosure, FIG. 2 is a diagram showing an overview of a boresight error of an electromagnetic wave due to a nonhomogeneous atmospheric propagation environment, FIG. 3 is a diagram showing a nonhomogeneous atmosphere propagation environment in a path between an LEO satellite and a ground station, and FIG. 4 is a diagram showing a zenith angle and an azimuth angle in a geocentric coordinate system for indicating an incidence angle of an antenna (electromagnetic wave).

Referring to FIGS. 1 to 4, the method for compensating a boresight error in an LEO satellite antenna according to the present disclosure is a method to compensate a boresight error considering a nonhomogeneous propagation environment due to the meteorological conditions on a path of electromagnetic wave arriving from the antenna of the moving low orbit satellite 210 to the ground station 220. First, the communication point of the LEO 210 and the location of the ground station 220 are converted into the geocentric coordinate system (i.e., to a zenith angle and an azimuth angle) (refer to FIG. 4), and the incidence angle θ of the electromagnetic wave radiated from the antenna of the LEO satellite 210 is set (step S101).

Next, a measured meteorological condition is calculated as a meteorological condition with specific altitude interval (for example, intervals set by dividing the altitude from the surface of the Earth with specific height such as $h_0$, $h_1$, ... $h_n$) by applying a specific formula to the measured meteorological condition (Step S102). Here, the measured meteorological condition may include at least one of atmospheric pressure, temperature, humidity, wind speed, wind direction, snow, rain, cloud, aerosol, and yellow sand. And the specific equation may be the Piecewise Cubic Hermite Interpolating Polynomial (PCHIP).

The calculation of the meteorological condition as described above may include calculating the nonhomogeneous propagation environment of the troposphere and that of the stratosphere, the meteorological data (atmospheric pressure, temperature, humidity, wind speed, wind direction, snow, clouds) measured by each ground station and the meteorological data (clouds, aerosols, yellow dust, etc.) measured by satellites and drones can be collected and calculated as meteorological data according to the specific altitude intervals ($h_0$, $h_1$, . . . $h_n$) with the Piecewise Cubic Hermite Interpolating Polynomial (PCHIP). Meteorological conditions for a specific location can be predicted after a certain period by calculating changes over time for snow, rain, cloud, and aerosol by using the wind speed and wind direction obtained from each coordinate.

When the calculation of the meteorological condition at a specific altitude interval is completed, the calculated meteorological condition at a specific altitude interval is calculated as an effective refractive index at a specific altitude interval (step S103). Here, the effective refractive index can be calculated by applying a Millimeter-wave Propagation Model (MPM) to the meteorological data which was calculated by applying a two-dimensional interpolation method to the meteorological data at a specific altitude interval (h0, h1, . . . hn).

When the calculation of the effective refractive index is completed, the atmosphere is divided into layers at specific altitude intervals (troposphere, stratosphere, mesosphere, thermosphere), and the arrival coordinates of the electromagnetic waves for which the atmospheric environment are considered are calculated using the calculated effective refractive index and specific techniques (Step S104). The calculation of the arrival coordinates of such electromagnetic waves will be described later.

The atmosphere is divided into layers of a specific height interval again and may be set as a dielectric media having an effective refractive index calculated by the MPM. The specific technique may be the ray tracing method. Here, the ray tracing method refers to a method creating a photographic expression by tracing and calculating the path of light from a virtual light source in the middle of a 3D model.

Thereafter, the error between the location of the ground station 220 and the calculated arrival coordinate of the electromagnetic wave is calculated as a zenith angle and an azimuth angle of the geocentric coordinate system as shown in FIG. 4 (step S105).

Next, it is determined whether the error between the location of the ground station and the arrival coordinate of the electromagnetic wave is less than a target error (step S106), and if the error is not less than the target error, then the error is added to the incidence angle of the electromagnetic wave (step S107), and the process returns to the step S104. The target error may be 0.01%. However, such a target error value is not limited to 0.01% but may be changed to various values depending on the purposes to which the present disclosure is applied or the purposes to be pursued (goal).

On the other hand, in the determination step (S106), if the error between the location of the ground station 220 and the arrival coordinate of the electromagnetic wave is less than the target error (e.g., 0.01%), then the compensating angle for the incidence angle of the electromagnetic wave is decided (step S108).

Figure 5:
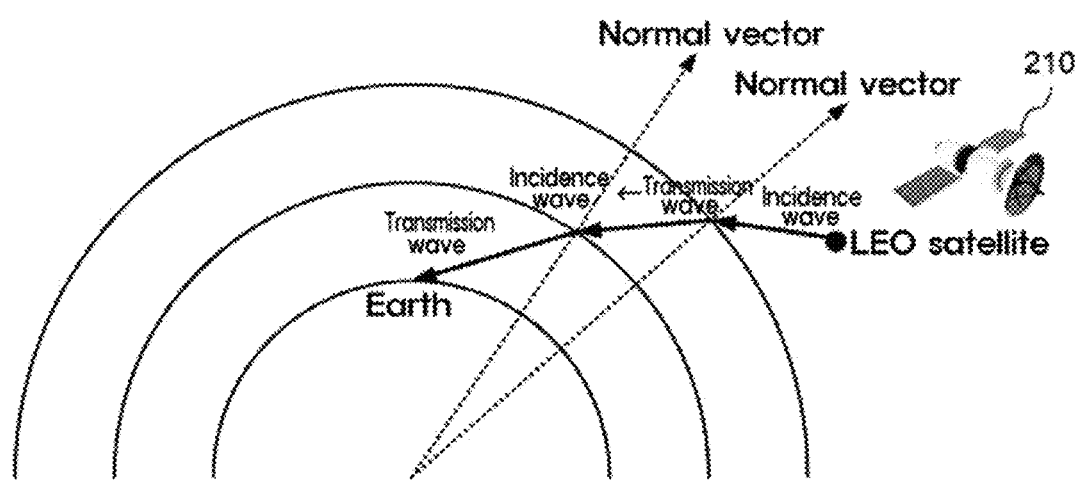
FIG. 5 is a diagram showing the refraction of an electromagnetic wave in the atmospheric environment relating to calculating the arrival coordinates of the electromagnetic wave.

FIG. 5 is a diagram showing the refraction of an electromagnetic wave according to an atmospheric environment in connection with calculating the arrival coordinates of the electromagnetic wave.

Referring to FIG. 5, the drawing is related to calculating the arrival coordinates of the electromagnetic waves in the step S104, where the path of the electromagnetic wave is refracted at a layer boundary due to the differences in effective refractive index for the atmospheric layers divided into several spheres, and the refraction of the electromagnetic wave is calculated.

An incidence angle is defined based on the normal vector connected from the center of the earth to the boundaries of each layer, and the transmission angle and the direction of the transmitted wave can be calculated using Snell's law. By repeating this process whenever the electromagnetic wave reaches the respective boundaries of the divided atmospheric layers, the final coordinate (i.e., the arrival coordinate of the electromagnetic wave) can be calculated.

By subdividing the zenith angle in the range of 0° to 180° and the azimuth angle in the range of 0° to 360°, any direction or position in 3-dimensional space can be expressed. An incidence angle θ of an electromagnetic wave is calculated as a zenith angle and an azimuth angle separately as shown in FIG. 4.

The initial incidence angle of an electromagnetic wave is set as an angle between the LEO satellite 210 and the final reception point of the electromagnetic wave (see FIG. 4), then the angle of a linear path between the arrival coordinate of the electromagnetic wave and the LEO satellite 210 (angle ①) and the angle of a linear path between the final reception point of the electromagnetic wave and the LEO satellite 210 (angle ②) are separated into a zenith angle and an azimuth angle, and the difference of the angles (angle ①-angle ②) is set as an error angle. The above process is repeated by summing the error angle and the incidence angle performed before measuring the angle of a linear path between the final reception point of the electromagnetic wave and the LEO satellite 210 (angle ②). Through a series of those processes, it is possible to finally decide the compensating angle for the incidence angle of the electromagnetic wave.

Here, further explanation will be given concerning the compensation for the incidence angle of the electromagnetic wave (boresight error compensation) of step S108.

Table 1 below shows the measured values of compensation distance for boresight error according to the numbers of repetition of the incidence angle compensation (boresight error compensation) (Satellite: altitude 500 km, latitude 30° N, longitude 127° E, Base station: latitude 37.1° N, longitude 127.0333° E, date of measurement: Jun. 10, 2020, Osan, Republic of Korea).

TABLE 1

| Geocentric coordinate system | Location of the ground station | $1^{st}$ Arrival location | $2^{nd}$ Arrival location | $3^{rd}$ Arrival location |
| --- | --- | --- | --- | --- |
| Zenith angle | 64.84928009° | 64.84987770° | 64.84928011° | 64.84928009° |
| Azimuth angle | 306.80518732° | 306.80518968° | 306.80518732° | 306.80518732° |
| Compensating distance for boresight error | — | 21.519 m | 0.00084 m | Less than 0.00001 m |

As shown in Table 1 above, the compensating distance for boresight error is shorter and shorter as it goes to the $1^{st}$, $2^{nd}$, and $3^{rd}$ arrival locations. As the compensation process is repeated, the boresight error is significantly reduced, thus the accuracy for the arrival coordinate of the electromagnetic wave can be improved.

Table 2 below shows the measured values of compensation distance for a boresight error according to the specific satellite communication point (altitude 500 km) (Base station: latitude 37.1° N, longitude 127.0333° E, date of measurement: Jun. 10, 2020, Osan, Republic of Korea).

TABLE 2

| Latitude | 30° N (Table 1) | 25° N | 20° N | 18° N |
| --- | --- | --- | --- | --- |
| Longitude | 127° E (Table 1) | 120° E | 127° E | 120° E |
| Compensation distance for boresight error | 21.519 m (Table 1) | 329.355 m | 2056.62 m | 17654.2 m |

As shown in Table 2 above, the boresight error compensation distance is greatly increased when using latitude (north latitude) as a variable rather than longitude. It is concluded that the lower a latitude is, the greater a boresight error of an incidence angle of an electromagnetic wave that is radiated from a moving LEO satellite to a ground (base station) is.

As described above, according to the present disclosure, by considering a nonhomogeneous propagation environment due to the meteorological conditions on a path of an electromagnetic wave reaching a ground station from an antenna of a moving LEO satellite, the method repeatedly compensates boresight error by calculating the boresight error based on refraction and attenuation, thereby increasing the arrival accuracy of an electromagnetic wave in the atmospheric environment.

Although the embodiments of the present disclosure have been illustrated and described above, the present disclosure is not limited to the specific embodiments described above and is not departing from the gist of the present disclosure claimed in the claims. A person having ordinary skill in the art may implement various modifications, and such modifications are included within the scope of the appended claims.

What is claimed is:

1. A method for compensating a boresight error in a low earth orbit (LEO) satellite antenna by considering a nonhomogeneous propagation environment due to a meteorological condition on a path of an electromagnetic wave reaching a ground station from the antenna of a moving LEO satellite, the method comprises the steps of:
   a) converting a communication point of the LEO satellite and the location of the ground station into the geocentric coordinate system, and setting an incidence angle of the electromagnetic wave radiated from the LEO satellite antenna;
   b) calculating a meteorological condition at a specific altitude interval by applying a specific formula to a measured meteorological condition;
   c) calculating the calculated meteorological condition at a specific altitude interval as an effective refractive index at a specific altitude interval;
   d) dividing the atmosphere into layers at the specific altitude intervals, and calculating an arrival coordinate of the electromagnetic wave for which the atmospheric environment is considered by using the calculated effective refractive index and a specific technique;
   e) calculating an error between the location of the ground station and the arrival coordinate of the electromagnetic wave as a zenith angle and an azimuth angle of the geocentric coordinate system;
   f) determining whether the error between the location of the ground station and the arrival coordinate of the electromagnetic wave is less than a target error or not, and when the error is not less than the target error, adding the error to the incidence angle of the electromagnetic wave and returning to step d); and
   g) in step f), when the error between the location of the ground station and the arrival coordinate of the electromagnetic wave is less than the target error, deciding a compensation angle for the incidence angle of the electromagnetic wave, wherein the specific formula in step b) is the Piecewise Cubic Hermite Interpolating Polynomial (PCHIP), and wherein, in step c), the effective refractive index is calculated by applying a Millimeter-wave Propagation Model (MPM) to the meteorological data which is calculated by applying a two-dimensional interpolation method to the meteorological data at a specific altitude interval (h0, h1, . . . hn).

2. The method for compensating a boresight error in a low earth orbit (LEO) satellite antenna according to claim 1, wherein the meteorological condition measured in step b) comprises at least one of atmospheric pressure, temperature, humidity, wind speed, wind direction, snow, rain, cloud, aerosol, and yellow sand.

3. The method for compensating a boresight error in a low earth orbit (LEO) satellite antenna according to claim 1, wherein, in step d), the atmosphere is divided into layers at specific altitude intervals and set as a dielectric media having effective refractive index calculated by the MPM.

4. The method for compensating a boresight error in a low earth orbit (LEO) satellite antenna according to claim 1, wherein, in step d), the specific technique is the ray tracing method.

5. The method for compensating a boresight error in a low earth orbit (LEO) satellite antenna according to claim 1, wherein, in step f), the target error is 0.01%.

* * * * *